Aug. 28, 1962     S. J. DAANEN ET AL     3,051,303
COMBINED CONTAINER AND SERVING DISH
Filed April 7, 1960
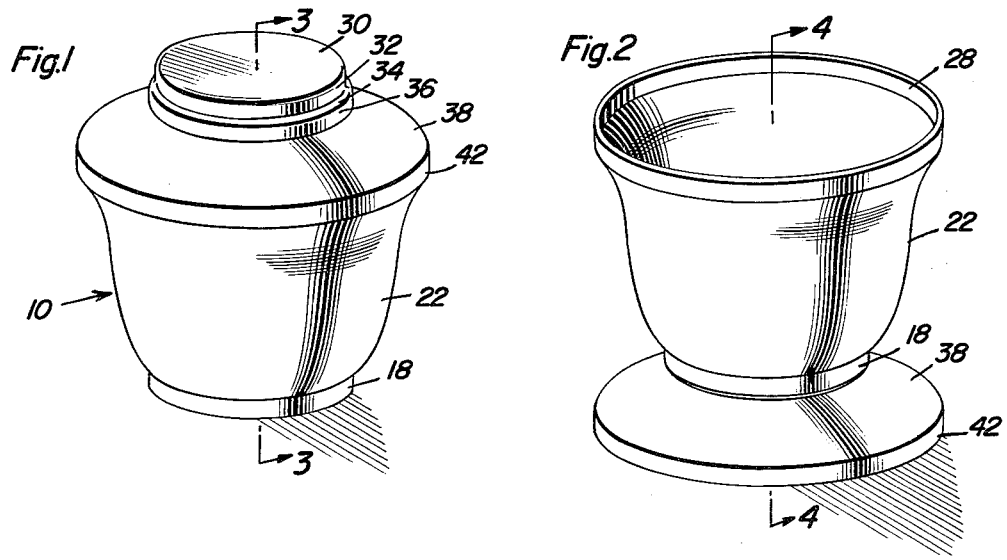
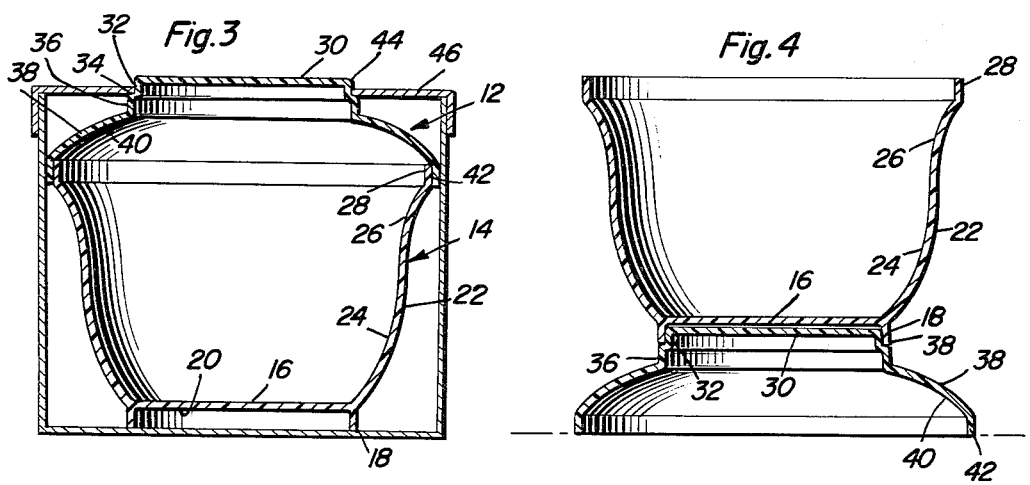
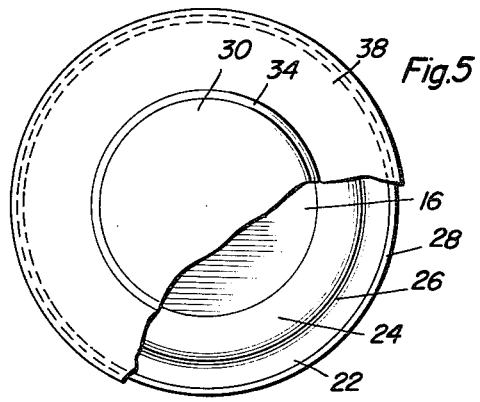
Sylvester J. Daanen
Thomas H. Lutsey
INVENTORS
BY Clarence A. O'Brien
and Harvey B. Jacobson
Attorneys United States Patent Office 3,051,303
Patented Aug. 28, 1962

3,051,303
COMBINED CONTAINER AND SERVING DISH
Sylvester J. Daanen, 1014 Ernst Drive, Green Bay, Wis., and Thomas H. Lutsey, 846 St. Francis Road, De Pere, Wis.
Filed Apr. 7, 1960, Ser. No. 20,596
2 Claims. (Cl. 206—45.31)

The present invention generally relates to a container construction and more particularly a device for use in the sanitary packaging, storing and serving of food products especially cheese, ice cream, other similar dairy products as well as other similar food products.

The primary object of the present invention is to provide a container which is a combination storage container and serving dish having a structure which enables the cover of the container to be removed and then serve as a base or pedestal for the container whereby the container then becomes an attractive serving dish that may be effectively employed on substantially any table in view of its highly attractive appearance.

Another object of the present invention is to provide a combination storage container and serving dish especially for use in storing and serving food such as dessert, dips, spreads, baby foods, fruit cocktails, seafood cocktails, dairy products and the like in public places as well as in homes and which facilitates a more efficient and sanitary manner of serving and storing foods of the above nature.

Still another important object of the present invention is to provide a combination storage container and serving dish which facilitates easier and more sanitary storage of unused portions of such foods by simply resealing the cover thereby providing air tight and odor free storage whereby the device may be supported on any suitable shelf or in a refrigerator if desired.

Another important object of the present invention is to provide a combination container for storage of a food product as well as a serving dish for serving the food product which is adapted for use with well-known filling and dispensing machinery with the components of the container being perfectly nested to permit perfect positive dispensing thereof with automatic filling machines thus rendering the container economical in use and operation.

Another feature of the present invention of importance is the particular construction of the container and a cover therefor enabling it to be packed in display boxes having a hole in the cover thereof so that the cover of the container or dish may partially protrude through the cover of the display box thereby offering prospective customers a chance to see the item itself thereby enabling such foods to be displayed with their natural and physical characteristics observable thus aiding in the sales of such products.

Still another important feature of the present invention is the construction of a combination container and serving dish which is extremely simple in construction, preferably constructed of plastic material with the container incorporating two pieces of readily molded material in which the lower portion of the container has a socket or recess opening downwardly for receiving a projection on the upper surface of the cover whereby the cover may be locked to the bottom of the lower portion of the container thereby forming a base for the container with the entire structure being quite simple in construction and extremely inexpensive in manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the combination storage container and serving dish of the present invention illustrating its construction when in use as a storage container;

FIGURE 2 is a perspective view of the invention when in use as a serving dish;

FIGURE 3 is a vertical sectional view taken substantially upon a plane passing along section line 3—3 of FIGURE 1 with the display device added thereto in section;

FIGURE 4 is a detailed sectional view taken substantially upon a plane passing along section line 4—4 of FIGURE 2 illustrating further structural details of the invention and the orientation thereof when used as a serving dish; and FIGURE 5 is a top plan view of the construction of FIGURE 1 with portions thereof broken away illustrating the orientation of the remainder of the container.

Referring now specifically to the drawings, the numeral 10 generally designates the combination storage container and serving dish of the present invention which includes a combination cover and base or pedestal generally designated by the numeral 12 and a bottom container portion or receptacle generally designated by the numeral 14 both of which are constructed of readily available material such as a high impact plastic material on the order of .035 inch thick although this is, of course, variable.

The container portion 14 includes a flat horizontal bottom wall 16 having a depending peripheral flange 18 which defines a downwardly opening or downwardly facing socket or recess 20. Extending upwardly from the peripheral edge of the circular bottom 16 is a peripheral side wall 22 that flares outwardly and is provided with a lower concave portion 24 facing inwardly and an upper slightly convex portion 26 facing inwardly which rigidifies the structure of the peripheral wall 22 thereby enabling the wall to be of relatively thin material but yet sufficiently rigid for retaining food products. The reverse curve provided in the peripheral wall will effectively reinforce the peripheral wall 22 while at the same time providing a highly decorative and attractive container. At the upper end of the peripheral wall 22 which flares outwardly is an upstanding cylindrical flange 28 parallel to the flange 18 and, of course, having a larger diameter than the flange 18. This structure results in an outwardly flared or outwardly and upwardly tapering container portion 14 for receiving a predetermined quantity of food product (not shown). Further, the size and dimensions of the container portion may vary as desired.

The combination cover and base 12 includes a flat circular top plate 30 having a depending cylindrical flange 32 at the outer edge thereof. The flange 32 terminates in an offset portion 34 at the lower edge thereof and the offset portion is connected integrally to a second cylindrical flange 36 that is parallel with the flange 32 but which is spaced slightly outwardly therefrom whereby the offset 34 is disposed outwardly and forms a peripheral shoulder for the flange 32. The flange 36 is integral with an outwardly extending and downwardly curved peripheral wall 38 having a convex outer surface and a concave inner surface designated by the numeral 40. The peripheral wall 38 terminates in a depending cylindrical flange 40 paralleling the flanges 32 and 36 but having a larger diameter than the flanges 32 and 36. The cylindrical flange 42 is also telescopically engaged with the flange 28 on the upper end of the peripheral wall 22 and is of such a size that it will frictionally grip the flange 28 when inserted thereon thus retaining the cover 12 in position on the open upper end of the container portion 22 for retaining the food products in sealed relation. By lifting up on the cover 12 and overcoming the frictional resistance of the frictional grip between the flange 42 and the flange 28, the cover 12 may be easily removed thus exposing the food products so that they may be consumed.

When the cover has been removed, it is then used as a base or pedestal as illustrated in FIGURES 2 and 3. This is accomplished due to the relationship of the top plate 30 and flange 32 in relation to the flange 18 and the socket or recess 20 formed thereby. The external diameter of the flange 32 is such that it will be frictionally received within the flange 18. The frictional engagement between the flange 32 and the flange 18 will retain the cover 12 in assembled position with the bottom of the container portion with the lower edge of the flange 42 forming an enlarged support area for engaging a supporting surface.

When the food product within the container portion 14 has been partially consumed and it is desired to reclose the container, it is only necessary to pull outwardly on the cover thus overcoming the frictional between the flanges 18 and 32 thus removing the cover from the bottom end of the container portion 14 after which the cover may be assembled on the open end of the container portion 14 in an obvious manner. The particular material from which the component parts of the combination storage container and serving dish are constructed facilitates the gripping engagement therebetween. Also, the plastic material from which the combination container and serving dish is constructed enables the food product contained therein to be readily observed since the plastic may be constructed of transparent material or provided with transparent areas and colored in any suitable manner to enhance the appearance of the food product. Also, the tapered construction of both the lid or cover and the lower container portion enables perfect nesting of the components for automatic dispensing thereof.

Another feature of the invention is the orientation of the top plate 30 and the flange 32 which enables it to protrude through an opening 44 in a display box 46 or the like thereby enabling the raised portion to be easily viewed by the public thus allowing them to view the products within the container in order to determine the color and other physical characteristics thereof thus aiding in the sales of the food products.

The present invention provides a tight fitting cover and a securely attached detachable base formed therefrom when the cover is removed in which both the components of the container may actually be decoratively formed in any suitable manner to enhance the appearance thereof for use as a serving dish.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combination storage container and serving dish comprising a lower container portion, and a removable cover, said container portion having a downwardly opening recess in the bottom thereof defined by a cylindrical peripheral flange, said cover being generally convex and having an upwardly extending protrusion on the upper surface thereof defined by a cylindrical peripheral flange, said peripheral flange on the cover adapted to telescopically and frictionally engage with the peripheral depending flange on the container portion for attaching the cover below the container portion and forming a base for the container portion, said cover normally being received on the open upper end of the container portion and forming a closure therefor, the open upper end of the container portion being provided with a cylindrical peripheral flange, the lower open end of the cover also having a cylindrical peripheral flange telescopically and frictionally engaging over the upwardly extending flange on the open upper end of the container portion thereby detachably and sealingly retaining the cover on the container portion, the container portion being constructed of thin plastic material and tapering upwardly and outwardly and includes a lower inwardly facing concave portion and an upper inwardly facing convex portion reinforcing the container portion and rigidifying the peripheral wall thereof, the upstanding peripheral flange forming the protrusion being provided with a peripheral radial outwardly extending shoulder at the lower end thereof for limiting the engagement between the depending flange on the container portion and the upstanding flange on the cover for securely locking the cover to the container portion to serve as a rigid base therefor, said shoulder being of a width equivalent to the width of said depending flange so as to give the appearance of a unitary structure.

2. The structure as defined in claim 1 wherein said container portion and removable cover are constructed of transparent material, and a carton enclosing the container portion and cover, said carton having a removable top and an opening in the top thereof receiving the upwardly extending protrusion on the cover said top being supported on the outwardly extending shoulder whereby the transparency of the cover enables the contents of the container portion and cover to be viewed exteriorly of the carton, and whereby both the top and cover can be removed as a unitary member.

References Cited in the file of this patent

UNITED STATES PATENTS

| | | |
|---|---|---|
| 1,778,175 | Thune | Oct. 14, 1930 |
| 2,274,253 | Howell | Feb. 24, 1942 |

FOREIGN PATENTS

| | | |
|---|---|---|
| 21,917 | Great Britain | 1905 |
| 242,877 | Great Britain | Nov. 19, 1925 |